May 3, 1938. C. E. BANNISTER 2,116,299
HOSE COUPLING
Filed Feb. 4, 1937

CLYDE E. BANNISTER INVENTOR
BY Willard D. Eakin
ATTORNEY

Patented May 3, 1938

2,116,299

UNITED STATES PATENT OFFICE 2,116,299

HOSE COUPLING

Clyde E. Bannister, Akron, Ohio

Application February 4, 1937, Serial No. 123,969

2 Claims. (Cl. 285—87)

This invention relates to hose couplings and its chief objects are to provide a coupling member adapted for quick and easy assembly with the hose and without requiring expensive or cumbersome tools such as are required in the case of swaged-on couplings, thus making it practicable to mount the coupling member on the hose "in the field", even in the case of the heavy rotary driller's hose used in oil well drilling; to provide a coupling adapted for secure and non-leaking attachment to the hose; to provide simplicity of construction and economy of manufacture; and to provide for ready and non-destructive disassembly of the coupling member with relation to the hose.

Figure 1:
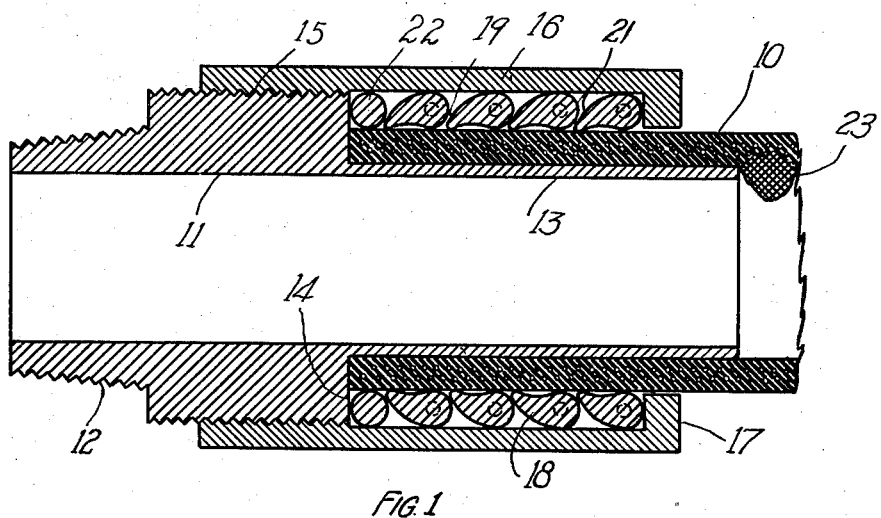
Figure 1 is a longitudinal section of a coupling member and a part of the hose on which it is mounted, embodying my invention in its preferred form.

Referring to the drawing, the hose is shown at 10 and the coupling member, here shown as a male member although the invention of course is equally applicable to the female member, comprises a body member 11 formed with an externally threaded screw-coupling portion 12, a nipple portion 13 adapted to be entered in the end portion of the hose 10, an external shoulder 14 adapted to serve as a stop for the end face of the hose wall, and an external thread 15 for engagement with the internally threaded end portion of a pull-up sleeve 16 which is formed at its opposite end with an internal flange 17 adapted for engagement with hose-clamping means mounted between the sleeve and the hose and adapted, upon setting up of the sleeve 16 on the body member 11, to clamp the hose wall against the nipple portion 13 of the member 11.

Figure 2:
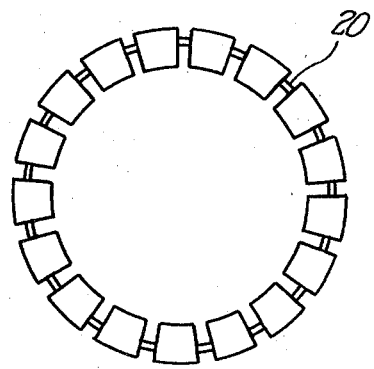
Figure 2 is a face view of one of the ring members constituting a part of the assembly of Figure 1.

The means for so clamping the hose comprises, in Figures 1 and 2, a series of ring members 18, which preferably but not necessarily are endless, each comprising a circumferentially spaced series of clamping pawls 19 connected by short reaches of metal 20, preferably of small cross-section, adapted to turn upon an annular axis as the pawls 19 are rotated on the same axis to force their outer ends inward against the hose wall to clamp it against the nipple portion 13 of the member 11, each pawl member 19 being formed on its outer side with a cam surface 21 adapted to coact with the adjacent surface of the hub portion of the pawls of the ring member 18 next ahead of it, or, as to the pawls of the foremost ring member, with a surface which is stationary with relation to the member, which preferably although not necessarily is provided by mounting, between the hose-wall and the sleeve 16 and against the shoulder 14 of the member 11, a ring member 22, preferably but not necessarily endless, of circular cross-section or at least with a cam surface of appropriate contour for coaction with the cam surfaces of the pawls of the adjacent ring member 18.

The ring members 18 conveniently may be formed by first producing either an endless ring or a straight strip of metal having throughout the cross-section desired for the pawls, then making saw-cuts in it to define the individual pawls while leaving the reaches 20 unsevered, and then, in the case of the flat strip, bending it to circular form.

In the operation of the device as described the parts are assembled as is clearly shown in Figure 1 and then the sleeve 16 is screwed forward on the member 11, which can readily be done by means of ordinary wrenches. This causes the pawls 19 of each ring member to be swung inward in constantly tighter clamping relation against the hose wall, by contact of their cam faces 21 against the hub portions of the pawls of the ring next ahead or, in case of the pawls of the foremost ring 18, against the special ring member 22. Thus the hose wall is tightly clamped in sealing relation against the nipple 13, and preferably at a multiplicity of closely spaced positions, although I do not wholly limit my invention to a plurality of the pawl-formed rings.

The invention is especially advantageous in the case of heavy driller's hose of the type here shown, which has a wire-mesh reinforcement 23, which provides a stop and a firm engagement for the pawls as they bite through or indent the overlying material, which may be rubber with or without fiber reinforcement.

Disassembly of the structure, without destruction of any of the parts, can readily be effected by reversal of the operation described.

Figures 3, 4:
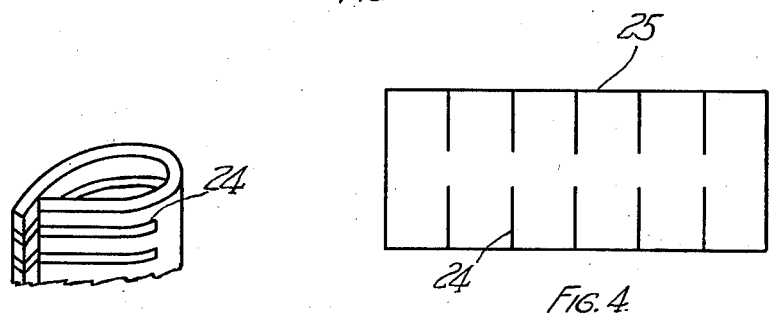
Figure 3 is a sectional view of an alternative type of ring member, of cheaper construction.
Figure 4 is a plan view of a piece of sheet metal illustrating one stage of the preferred process of producing a ring member such as that shown in Figure 3.

Figures 3 and 4 illustrate a less expensive type of pawl-ring member which may be formed by making saw-cuts 24 in a suitably shaped piece of flat sheet metal 25 (Fig. 4) and then putting it through appropriate bending operations to bring it to the shape shown in Figure 3, or by first giving a piece of sheet metal that general shape and then making the saw-cuts.

Other modifications, some obvious and some perhaps inventive, will no doubt occur to others, and I do not wholly limit my invention to the specific embodiments here shown.

I claim:

1. A hose-coupling assembly comprising a sleeve adapted to surround the hose, a plurality of circumferential series of pawls within the sleeve and means engaging the rear-most series of pawls for forcing a plurality of the series of pawls toward the end of the hose, the pawls of one series having cam-action engagement with those of the next series for forcing them against the hose in their forward movement.

2. A hose-coupling assembly comprising a sleeve adapted to surround the hose, a circumferential series of pawls within the sleeve, means for forcing the pawls with their points foremost toward the end of the hose, and cam means for forcing them inward against the hose in such forward movement, a plurality of the pawls of the series being of an integral piece of metal formed with reaches of relatively small cross section connecting adjacent pawls.

CLYDE E. BANNISTER.